(12) United States Patent
Chen

(10) Patent No.: US 9,645,985 B2
(45) Date of Patent: May 9, 2017

(54) SYSTEMS AND METHODS FOR CUSTOMIZING TEXT IN MEDIA CONTENT

(71) Applicant: Cyberlink Corp., Shindian, Taipei (TW)

(72) Inventor: Hsieh-Wei Chen, Taoyuan (TW)

(73) Assignee: CYBERLINK CORP., Shindian, Taipei (TW)

( * ) Notice: Subject to any disclaimer, the term of this patent is extended or adjusted under 35 U.S.C. 154(b) by 239 days.

(21) Appl. No.: 14/085,963

(22) Filed: Nov. 21, 2013

(65) Prior Publication Data

US 2014/0278370 A1   Sep. 18, 2014

Related U.S. Application Data

(60) Provisional application No. 61/788,741, filed on Mar. 15, 2013.

(51) Int. Cl.
*G06F 17/27* (2006.01)
*G06F 17/24* (2006.01)

(52) U.S. Cl.
CPC .......... *G06F 17/24* (2013.01); *G06F 17/2785* (2013.01)

(58) Field of Classification Search
CPC ........... G06K 2209/01; G06K 9/00463; G06K 9/3233; G06K 9/325; G06F 17/211; G06F 17/218; G06F 17/241; G06F 17/27
USPC ....... 704/9, 8, 3, 260, 235; 725/34; 715/839, 715/810, 756, 249, 248, 234, 203; 707/750, 736, 706, 625; 705/7.29; 455/556.2, 466; 382/228, 190
See application file for complete search history.

(56) References Cited

U.S. PATENT DOCUMENTS

| | | | |
|---|---|---|---|
| 7,089,504 B1* | 8/2006 | Froloff | G06F 17/241 715/764 |
| 8,126,220 B2 | 2/2012 | Greig | |
| 8,166,051 B1* | 4/2012 | Bauer | G06F 17/30622 707/749 |
| 8,259,992 B2 | 9/2012 | Basson et al. | |
| 8,374,646 B2* | 2/2013 | Shirai | G06T 11/60 455/556.2 |
| 8,588,825 B2* | 11/2013 | Jonsson | G06F 17/27 455/466 |
| 9,317,485 B2* | 4/2016 | Dent | G06F 17/211 |
| 9,342,613 B2* | 5/2016 | Arthurs | G06F 17/3089 |
| 2002/0111794 A1 | 8/2002 | Yamamoto et al. | |
| 2007/0011012 A1 | 1/2007 | Yurick et al. | |

(Continued)

OTHER PUBLICATIONS

Raisa Rashid et al. "Expressing Emotions Using Animated Text Captions" 2006.

(Continued)

*Primary Examiner* — Michael Colucci
(74) *Attorney, Agent, or Firm* — McClure, Qualey & Rodack, LLP

(57) ABSTRACT

Various embodiments are disclosed for facilitating automatic media editing. Media content is obtained and semantic analysis is performed on text in at least a portion of the media content to obtain at least one semantic textual segment each corresponding to a text section of the media content, wherein the text section comprises at least one word in the text in the at least a portion of the media content. At least one context token corresponding to the at least one semantic textual segment is generated. The text section is visually accentuated according to the context token.

32 Claims, 12 Drawing Sheets

(56) References Cited

U.S. PATENT DOCUMENTS

| | | | | |
|---|---|---|---|---|
| 2008/0320378 A1* | 12/2008 | Shuter | | G06T 11/60 715/203 |
| 2009/0153288 A1* | 6/2009 | Hope | | G06F 3/0482 340/3.1 |
| 2009/0164888 A1* | 6/2009 | Phan | | G06F 17/2785 715/248 |
| 2009/0208118 A1* | 8/2009 | Csurka | | G06K 9/00664 382/228 |
| 2009/0231490 A1 | 9/2009 | Chen et al. | | |
| 2010/0318360 A1* | 12/2010 | Uehara | | G10L 13/027 704/260 |
| 2011/0047508 A1* | 2/2011 | Metzler | | G06F 19/322 715/810 |
| 2011/0231180 A1* | 9/2011 | Padi | | G06F 17/289 704/3 |
| 2011/0276327 A1* | 11/2011 | Foxenland | | G10L 15/26 704/235 |
| 2012/0179982 A1* | 7/2012 | Gandhi | | G06Q 10/10 715/756 |
| 2012/0242897 A1* | 9/2012 | Chattopadhyay | | G06K 9/325 348/467 |
| 2012/0288203 A1* | 11/2012 | Pan | | G06F 17/30253 382/190 |
| 2013/0036117 A1* | 2/2013 | Fisher | | G06F 17/30041 707/736 |
| 2013/0067319 A1* | 3/2013 | Olszewski | | G06F 17/218 715/234 |
| 2013/0121410 A1* | 5/2013 | Chang | | H04N 19/91 375/240.12 |
| 2013/0218858 A1* | 8/2013 | Perelman | | G06F 17/30268 707/706 |
| 2013/0298159 A1* | 11/2013 | You | | H04N 21/478 725/34 |
| 2014/0032259 A1* | 1/2014 | LaFever | | G06Q 30/0201 705/7.29 |
| 2014/0081619 A1* | 3/2014 | Solntseva | | G06F 17/289 704/3 |
| 2014/0257789 A1* | 9/2014 | Zaric | | G06F 17/2223 704/8 |
| 2014/0258851 A1* | 9/2014 | Sesum | | G06F 17/2264 715/249 |
| 2015/0363478 A1* | 12/2015 | Haynes | | G06Q 10/101 707/625 |

OTHER PUBLICATIONS

C. Chapdelaine et al. "Designing Caption Production Rules Based on Face, Text and Motion Detections" IS&T/SPIE Symposium on Electronic Imaging: Human Vision & Electronic Imaging (SPIE #6806), San Jose, 2008.

Richang Hong et al. "Dynamic Captioning: Video Accessibility Enhancement for Hearing Impairment" 2010.

* cited by examiner

SYSTEMS AND METHODS FOR CUSTOMIZING TEXT IN MEDIA CONTENT

CROSS-REFERENCE TO RELATED APPLICATION

This application claims priority to, and the benefit of, U.S. Provisional Patent Application entitled, "Subtitle Modalization," having Ser. No. 61/788,741, filed on Mar. 15, 2013, which is incorporated by reference in its entirety.

BACKGROUND

With the ever-growing amount of digital content available to consumers through the Internet and other sources, consumers have access to a vast amount of content. With existing media editing tools, users manually edit subtitles or add captions in order to achieve a desired effect or style. This typically involves a great deal of effort on the part of the user in order to emphasize or convey the context of the media content being viewed. Thus, while many media editing tools are readily available, the editing process can be tedious and time-consuming.

SUMMARY

Briefly described, one embodiment, among others, is a method implemented in a media processing device. The method comprises obtaining, by the media processing device, media content and performing, by the media processing device, semantic analysis on text in at least a portion of the media content to obtain at least one semantic textual segment each corresponding to a text section of the media content, wherein the text section comprises at least one word in the text in the at least a portion of the media content. The method further comprises generating, by the media processing device, at least one context token corresponding to the at least one semantic textual segment and visually accentuating, by the media processing device, the text section according to the context token.

Another embodiment is a system for editing media content, comprising a processor and at least one application executable in the processor. The at least one application comprises a media interface for obtaining media content and a content analyzer for performing semantic analysis on text in at least a portion of the media content to obtain at least one semantic textual segment each corresponding to a text section of the media content, wherein the text section comprises at least one word in the text in the at least a portion of the media content. The at least one application further comprises a tokenizer for generating at least one context token corresponding to the at least one semantic textual segment and a visualizer for visually accentuating the text section according to the context token.

Another embodiment is a non-transitory computer-readable medium embodying a program executable in a computing device, comprising code that obtains media content and code that performs semantic analysis on text in at least a portion of the media content to obtain at least one semantic textual segment each corresponding to a text section of the media content, wherein the text section comprises at least one word in the text in the at least a portion of the media content. The code further comprises code that generates at least one context token corresponding to the at least one semantic textual segment and code that visually accentuates the text section according to the context token.

Another embodiment is a method implemented in a media processing. The method comprises obtaining, by the media processing device, media content and performing semantic analysis on a textual portion of the media content and generating, by the media processing device, textual context tokens based on the semantic analysis. The method further comprises performing semantic analysis on an audio portion and on a visual portion of the media content corresponding to the textual portion and generating context tokens relating to the audio and visual portions. The method further comprises combining, by the media processing device, the textual context tokens and the context tokens relating to the audio and visual portions and visually accentuating, by the media processing device, at least one context portrayed in at least a portion of media content according to the combined context tokens.

Another embodiment is a method implemented in a media processing device. The method comprises obtaining, by the media processing device, a photo collection comprising digital images and textual content and performing, by the media processing device, semantic analysis on the textual content to obtain at least one semantic textual segment each corresponding to a text section of the photo collection, wherein the text section comprises at least one word in the textual content in the at least a portion of the photo collection. The method further comprises generating, by the media processing device, at least one context token corresponding to the at least one semantic textual segment and visually accentuating, by the media processing device, the text section according to the context token.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

One perceived shortcoming with conventional media editing applications is the amount of time involved in manually editing subtitles or inserting captions into media content. The editing process may involve, for example, stylizing existing subtitles by changing the font color, font size, location of the subtitles, and so on. The editing process may also include inserting captions relating to commentary, descriptions, and so on into media content. However, editing media content on a frame-by-frame basis can be time consuming.

Various embodiments are disclosed for automatically modifying or generating stylized captions for semantic-rich media. In accordance with various embodiments, media content is obtained and semantic analysis is performed on at least a portion of the media content, wherein the semantic analysis may involve analyzing visual, audio, and textual cues embedded in the media content that convey the emotions and/or context corresponding to events portrayed in the media content.

As a result of the semantic analysis, context tokens characterizing the emotions, context, etc. associated with events being portrayed in the portion of media content are generated. A semantic fusion operation is applied to the context tokens to combine the context tokens, and the combined context tokens are mapped to the text that takes place in the portion of media content, where such text may comprise, for example, subtitles corresponding to dialog in the portion of media content and/or captions in the portion of media content (e.g., a caption describing a sound that occurs in a scene). Based on the mapping, the subtitles or text corresponding to the mapping are stylized in an automated fashion without the need for a user to manually apply special effects. They subtitles may be stylized by modifying the font, font size, subtitle location. The modification(s) may also include animation or effects applied to the subtitles.

Figure 1A:
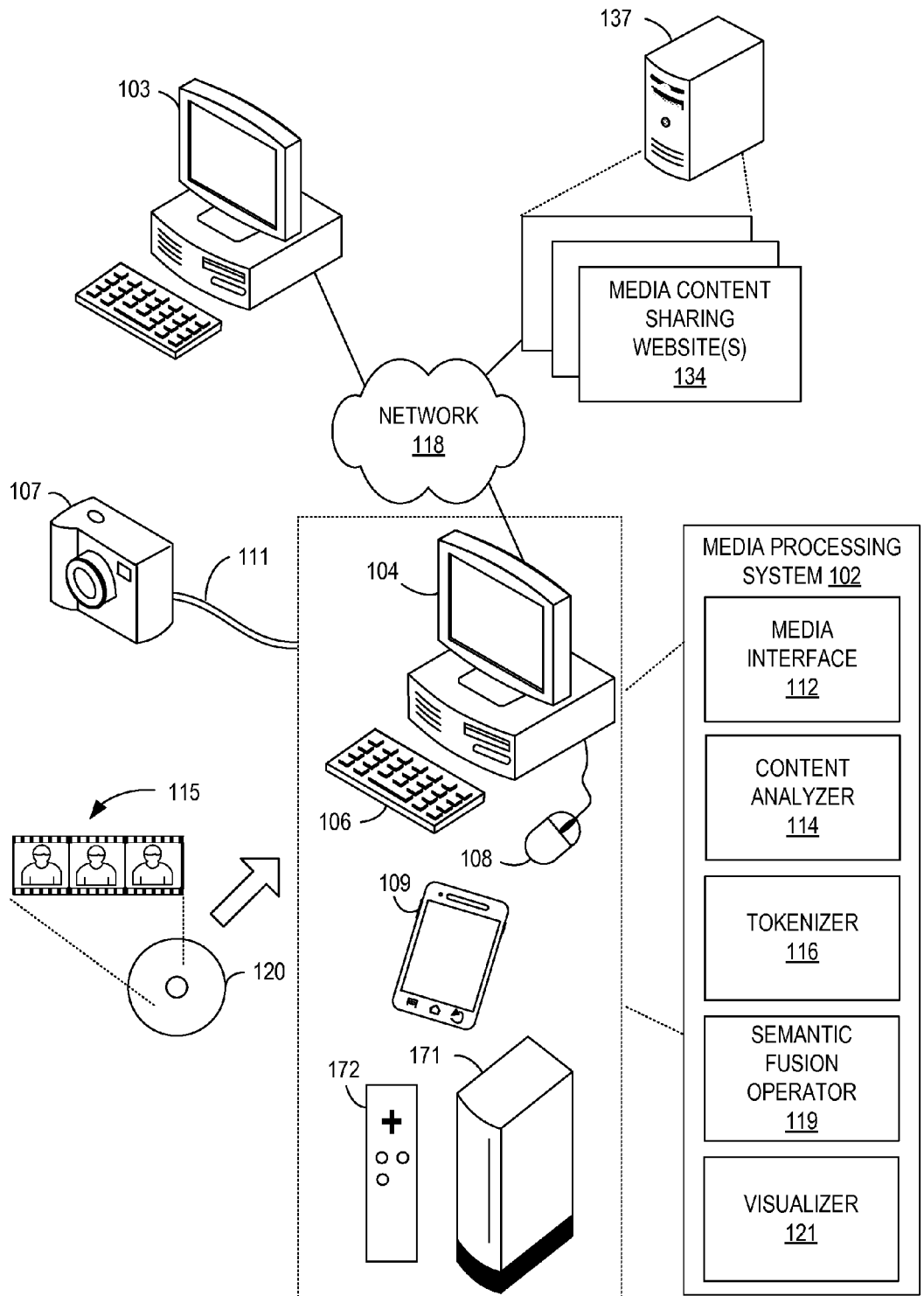
FIG. 1A is a block diagram of a media processing system for facilitating automatic media editing in accordance with various embodiments of the present disclosure.

A description of a system for facilitating automatic media editing is now described followed by a discussion of the operation of the components within the system. FIG. 1A is a block diagram of a media processing system 102 in which embodiments of the techniques for visually accentuating semantic context of text or events portrayed within media content. The media processing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the media processing system 102 is embodied as a smartphone 109 or tablet, the user may interface with the media processing system 102 via a touchscreen interface (not shown). In other embodiments, the media processing system 102 may be embodied as a video gaming console 171, which includes a video game controller 172 for receiving user preferences. For such embodiments, the video gaming console 171 may be connected to a television (not shown) or other display 104.

The media processing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the media processing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

The digital media content 115 may be encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1A, the media interface 112 in the media processing system 102 may also be configured to retrieve digital media content 115 directly from a digital recording device 107 where a cable 111 or some other interface may be used for coupling the digital recording device 107 to the media processing system 102. The media processing system 102 may support any one of a number of common computer interfaces, such as, but not limited to IEEE-1394 High Performance Serial Bus (Firewire), USB, a serial connection, and a parallel connection.

The digital recording device 107 may also be coupled to the media processing system 102 over a wireless connection or other communication path. The media processing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the media processing system 102 may receive digital media content 115 from another computing system 103. Alternatively, the media processing system 102 may access one or more media content sharing websites 134 hosted on a server 137 via the network 118 to retrieve digital media content 115.

The components executed on the media processing system 102 include a content analyzer 114, a tokenizer 116, a semantic fusion operator 119, a visualizer 121, and other applications, services, processes, systems, engines, or functionality not discussed in detail herein. The content analyzer 114 is executed to perform semantic analysis on the media content received by the media interface 112. The tokenizer 116 is executed to generate context tokens based on the semantic analysis, where the context tokens may be generated based on classification of visual cues, audio cues, and textual cues extracted by the content analyzer 114.

The semantic fusion operator 119 is executed to combine the context tokens generated by the tokenizer 116, and the visualizer 121 is executed to visually accentuate at least one context portrayed in the media content according to the context tokens. For various embodiments, the visualizer 121 modifies the appearance of subtitles/captions in the media content by modifying the font, font size, subtitle location, and so on. For some embodiments, the user may specify predetermined modifications to be applied for certain contexts. For example, the user may specify that if the content analyzer 114 determines that the context in the media content involves a scary scene, a certain font (e.g., a Gothic font style) is automatically applied to the subtitles relating to that scene or event.

Figure 1B:
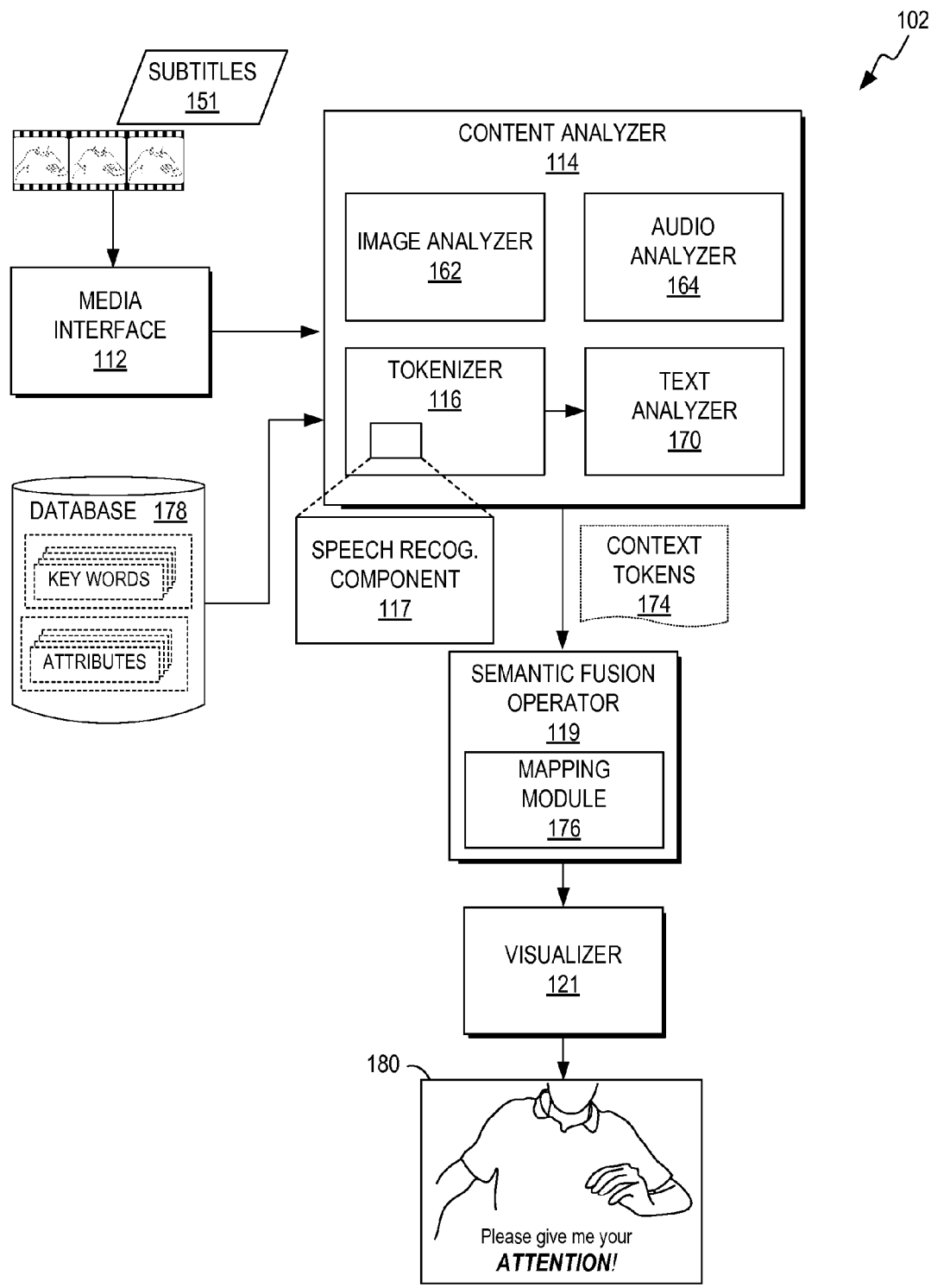
FIG. 1B illustrates the process flow between various components of the media processing system of FIG. 1A in accordance with various embodiments of the present disclosure.

The process flow between the various components of the media processing system 102 is now described. Reference is made to FIG. 1B, which illustrates various components of the media processing system 102 in FIG. 1A. To begin, the media interface 112 obtains media content, where the media content may include subtitles 151 corresponding to the text or commentary within the media content. The subtitles 151 may be embedded directly into the media content, stored separately and superimposed during playback, or stored according to other means as known to those skilled in the art.

The media interface 112 forwards the media content to the content analyzer 114, includes an image analyzer 162, an audio analyzer 164, a tokenizer 116, a text analyzer 170, and other applications, services, processes, systems, engines, or functionality not discussed in detail herein. The content analyzer 114 analyzes the semantic-rich media content to extract information later used for modifying or generating stylized subtitles corresponding to the media content. Note that the media content may comprise video content as well as digital images that include embedded captions stored, for example, as metadata.

The image analyzer 162 analyzes the media content and identifies such visual cues as facial expressions, body language of individuals depicted in the media content, physical attributes of individuals, and so on. The image analyzer 162 may also analyze attributes of the media content including, for example, lighting, color temperature, color hue, contrast level, and so on.

The audio analyzer 164 analyzes the media content and identifies such audio cues as speech tones of individuals within the media content, speed in which individuals are talking, speech volume, direction of speech, tone, and so on. The audio cues may also include intonation that may serve as an indication of one or more emotions of a speaker. The tokenizer 116 extracts textual information from the media content. For some embodiments, the tokenizer 116 may directly process the subtitles 151 and tokenize the words in the subtitles 151. For situations where the media content does not include subtitles 151, the tokenizer 116 may be configured to process the audio portion of the media content and extract text information. For some embodiments, a speech recognition component 117 in the tokenizer 116 converts audio data into text data when the media content does not include subtitles 151.

The tokenizer 116 processes textual information and breaks the information into meaningful elements that are significant as a group, wherein tokenization may be performed based on lexical analysis. The lexical analysis performed by the tokenizer 116 may be based on regular expressions, specific key words, and so on where such information may be stored in a database 178. For some embodiments, specific key words may comprise any of transition words, conjunctions, words that convey emphasis, repeated words, symbols, predefined keywords from a database, or any combination thereof. Based on the lexical analysis performed by the tokenizer 116, the text analyzer 170 extracts textual cues from the media content.

The data stored in the database 178 may also include key attributes such as visual attributes (e.g., lighting level, human facial expressions, body language, themes, color hue, color temperature), audio attributes (e.g., volume level), and other attributes. The image analyzer 162, audio analyzer 164, and text analyzer 170 respectively generate context tokens 174 relating to the media content. The semantic fusion operator 119 processes the context tokens 174 and combines context tokens relating to similar points within the media content. Note that for some embodiments, the context tokens 174 may be sent directly to the visualizer 121 without being processed by the semantic fusion operator 119.

Note that the content analyzer 114 may be configured to first analyze the textual content followed by the audio content and the visual content. Alternatively, the content analyzer 114 may be configured to first analyze the visual content followed by the text content and the audio content. In this regard, the content analyzer 114 may be configured to analyze the various components of the media content in a particular order or concurrently. The semantic fusion operator 119 combines the context tokens 174, and the mapping module 176 maps the combined context tokens 174 to specific text associated with the event or context in the media content, as described in more detail below. The visualizer 121 modifies the subtitles 151 corresponding to the text, where the modification may include, for example and without limitation, a change in the subtitle font, change in font size, change in font color, and change in subtitle location. The visualizer 121 incorporates the stylistic changes and outputs the modified media content 180.

Figure 3A:
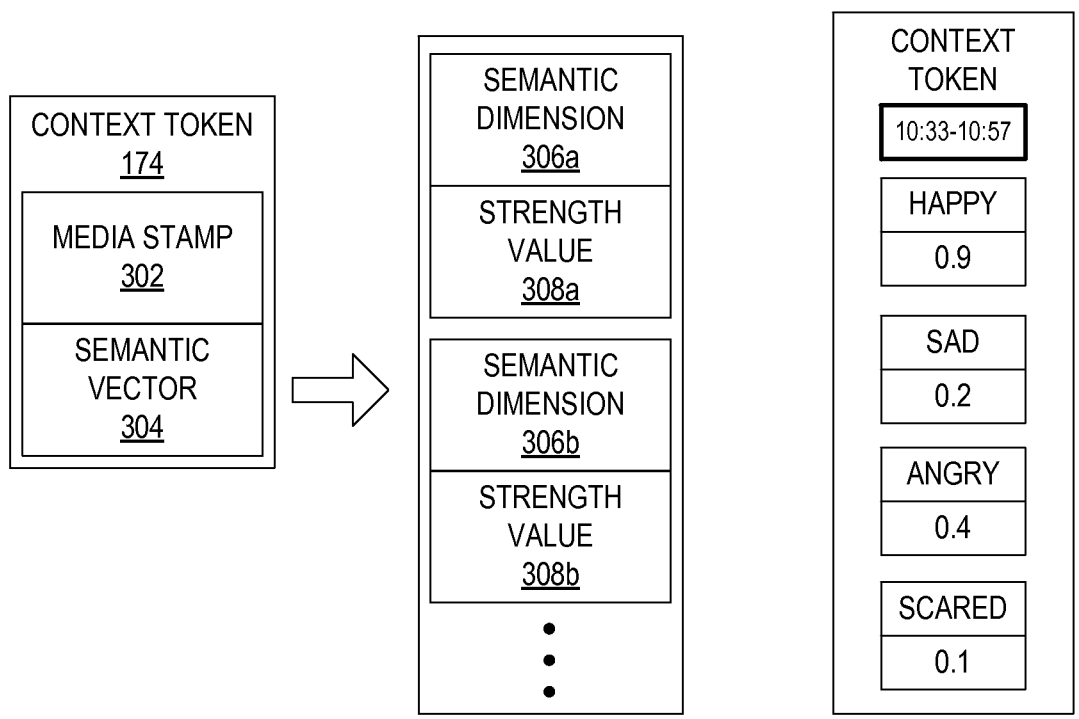
FIGS. 3A and 3B illustrate the format of a context token generated by the media processing system of FIG. 1A in accordance with various embodiments of the present disclosure.

With reference to FIG. 3A, each context token 174 comprises a media stamp 302 and a semantic vector 304, where the media stamp 302 corresponds to the media content. For some embodiments, the media stamp comprises a time stamp corresponding to a position within the media content. The media stamp may also specify a window of time relative to the time stamp. For example, the media stamp 302 may specify that the corresponding semantic vector 304 corresponds to a time interval spanning 10:33 to 10:57 in the media content.

The semantic vector 304 corresponds to semantic concepts derived by the image analyzer 162 (FIG. 1B), audio analyzer 164 (FIG. 1B), and the text analyzer 170 (FIG. 1B). Each semantic vector 304 within a context token may contain one or more entries where each entry comprises a semantic dimension 306 and a corresponding strength value 308. A semantic dimension 306 corresponds to a contextual cue within the media content and may include visual cues, audio cues, textual cues, and so on.

During pre-processing by the image analyzer 162, audio analyzer 164, and the text analyzer 170, visual, audio, and textual content are analyzed and represented by a context token $c_i$, which comprises a media stamp and one or more semantic vectors 304. A context token $c_i$ is represented by the following expression:

$$c_i = \{t_i | v_i\},$$

where $t_i$ denotes the media tamp of the context token, and $v_i$ denotes the semantic vector 304, which is expressed as:

$$v_i = (d_1, d_2, \ldots, d_n).$$

In the expression above, $d_j$ represents a strength or likelihood value towards a particular semantic dimension, such as but not limited to, a positive atmosphere, a negative atmosphere, a feeling of happiness, sadness, anger, horror, a feeling of mystery, a feeling of romance, a feminine theme, a masculine theme, and so on. For example, the visual content of a particular scene with dark and gray visual attributes may be assigned a higher strength value towards a semantic dimension of negativity, horror, and a feeling of mystery.

Speech (i.e., audio) content expressing delight and characterized by a high pitch intonation pattern may be assigned a higher strength value towards a positive feeling, a feeling of happiness, a feminine theme, while a soft, gentle, and low pitch intonation pattern may be assigned a higher strength value towards a positive feeling, a feeling of romance, and a masculine theme. Textual context comprising specific transition keywords may be assigned a higher strength value to a semantic dimension reflecting strong emphasis. For example, a specific phrase such as "with great power, comes great responsibility" may be assigned a higher strength value reflecting strong emphasis, a positive atmosphere, and a masculine theme. In this regard, the corresponding strength value 308 reflects a confidence level of the semantic dimension 306.

The semantic fusion operator 119 (FIG. 1B) combines the context tokens 174 to generate a fused semantic vector, and the mapping module 176 (FIG. 1B) maps the combined context tokens 174 to specific text associated with the event or context in the media content. Specifically, a fused semantic vector $v_f^T$ associated with a specified media stamp T is determined by the following expression:

$$v_f^T = f(v_v^T, v_a^T, v_t^T),$$

where $v_v^T$ denotes the semantic vector of visual content for media stamp T, $v_a^T$ denotes the semantic vector of audio content for media stamp T, $v_t^T$ denotes the semantic vector of text content for media stamp T, and $f()$ denotes the fusion function. The fusion function may be implemented as an operator for combining semantic vectors. For some embodiments, the fusion function may be expressed as a weighted summation function:

$$f(v_v^T, v_a^T, v_t^T) = \Sigma_{\{v,a,t\}} w_i^T v_i^T = w_v^T v_v^T + w_a^T v_a^T + w_t^T v_t^T,$$

where ($w_i$) corresponds to the weight value of each type of semantic vector (i.e., semantic vector of visual content, semantic vector of audio content, and semantic vector of textual content). Each weight value represents the confidence level of a particular semantic vector. For example, the weight value ($w_a^T$) for the audio semantic vector ($v_a^T$) may be higher if the audio cues during time period (T) comprise dramatic intonations that occur in a given scene. On the other hand, the weight value ($w_v^T$) for the visual semantic vector ($v_v^T$) may be lower if the same scene provides few visual cues. The fusion function may also be implemented according to a neural network model. The mapping module 176 then maps the fused semantic vector $v_f^T$ to media or corresponding subtitles according to the media stamp T.

FIG. 3A provides an example of a context token with a plurality of semantic dimensions 306a, 306b and corresponding strength values 308a, 308b. In the example shown, the context token 174 characterizes a window of time in the media content spanning from 10:33 to 10:57, where various semantic dimensions 306a, 306b are portrayed in the media content. In this example, the image analyzer 162, audio analyzer 164, and/or the text analyzer 170 determines based on various contextual cues within the media content that one or more individuals in the media content exhibit such emotions as happiness, sadness, anger, and fear. As shown, each of the semantic dimensions 306a, 306b having corresponding strength values 308a, 308b where the semantic dimension 306 corresponding to happiness has the highest confidence level.

Figure 3B:
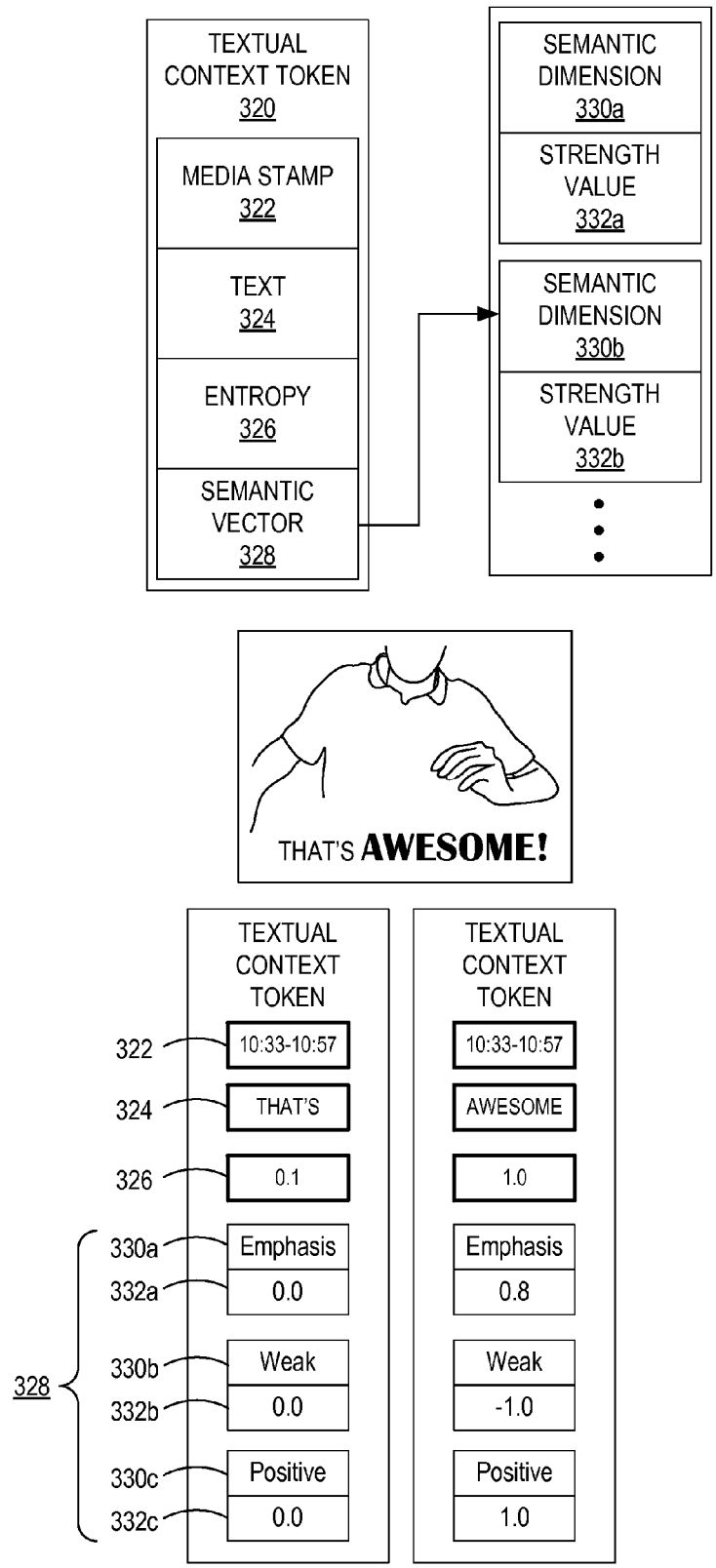

FIG. 3B is an example of a textual context token 320 comprising a media stamp 322 that specifies the time in which the corresponding text 324 is to be displayed. The textual context token 320 further comprises an entropy value 326 and a semantic vector 328, wherein the entropy value 326 represents the information content of the particular text section. In the example shown, the text content comprises the subtitle "That's Awesome!" The text segment is tokenized into two text tokens—"That's" and "Awesome". The text "That's" contains less useful information and is therefore assigned a lower entropy value, whereas the text "Awesome" is assigned a higher entropy value. The higher entropy value triggers the visual accentuation. Moreover, a negative value for a semantic dimension relieves the contradiction between a visual or audio context token. For example, the audio context token of the corresponding portion has a sadness value of −0.6 while the video context token has sadness value of 0.4. In this case, the bias would be corrected as the sadness dimension is adjusted to neutral state of zero given the values −0.6 and 0.4.

Figure 2:
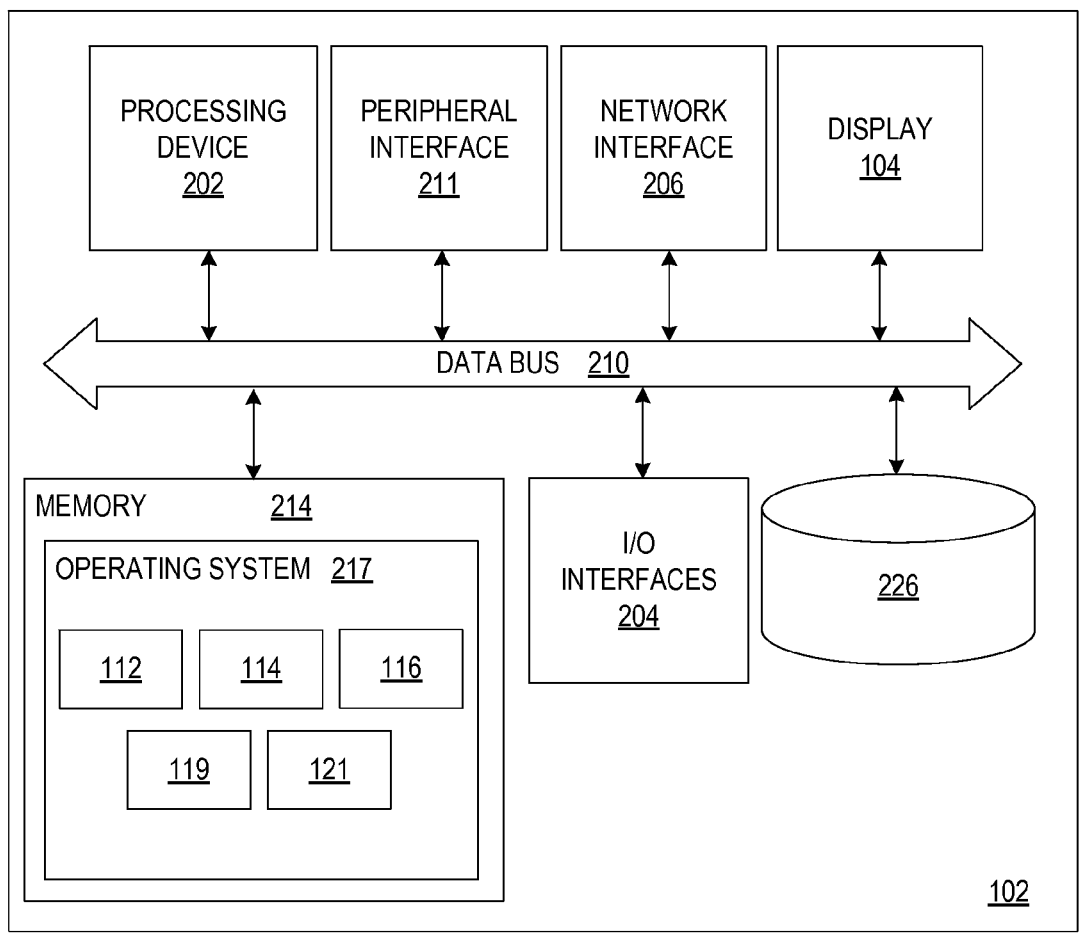
FIG. 2 is a detailed view of the media processing system of FIG. 1A in accordance with various embodiments of the present disclosure.

FIG. 2 is a schematic diagram of the media processing system 102 shown in FIG. 1A. The media processing system 102 may be embodied in any one of a wide variety of wired and/or wireless computing devices, such as a desktop computer, portable computer, dedicated server computer, multi-processor computing device, smartphone 109 (FIG. 1A), tablet computing device, and so forth. As shown in FIG. 2, the media processing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the media processing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, content analyzer 114, tokenizer 116, semantic fusion operator 119, visualizer 121) of the media processing system 102 depicted in FIG. 1A. In accordance with such embodiments, the components are stored in memory 214 and executed by the processing device 202. One of ordinary skill in the art will appreciate that the memory 214 can, and typically will, comprise other components which have been omitted for purposes of brevity.

In this regard, the term "executable" may refer to a program file that is in a form that can ultimately be run by the processing device 202. Examples of executable programs may be, for example, a compiled program that can be translated into machine code in a format that can be loaded into a random access portion of the memory 214 and run by the processing device 202, source code that may be expressed in proper format such as object code that is capable of being loaded into a random access portion of the memory 214 and executed by the processing device 202, or source code that may be interpreted by another executable program to generate instructions in a random access portion of the memory 214 to be executed by the processing device 202, etc. An executable program may be stored in any portion or component of the memory 214 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Input/output interfaces 204 provide any number of interfaces for the input and output of data. For example, where the media processing system 102 comprises a personal computer, these components may interface with one or more user input devices via the I/O interfaces 204, where the user input devices may comprise a keyboard 106 (FIG. 1A) or a mouse 108 (FIG. 1A). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The media processing system 102 may communicate with one or more computing devices via the network interface 206 over the network 118 (FIG. 1A). The media processing system 102 may further comprise mass storage 226. The peripheral interface 211 supports various interfaces including, but not limited to IEEE-1294 High Performance Serial Bus (Firewire), USB, a serial connection, and a parallel connection.

Figure 4:
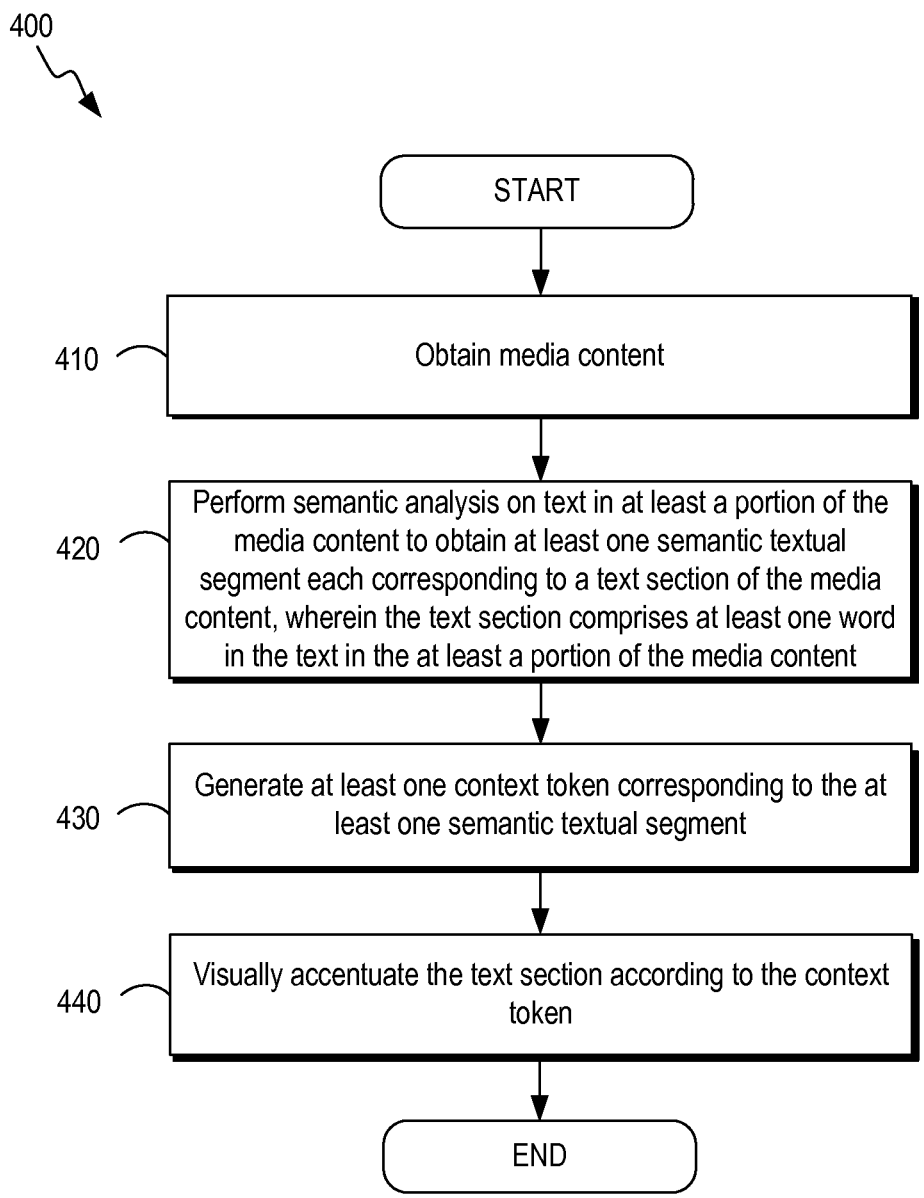
FIG. 4 is a top-level flowchart illustrating examples of functionality implemented as portions of the media processing system of FIG. 1A for facilitating automatic media editing according to various embodiments of the present disclosure.

Reference is made to FIG. 4, which is a flowchart 400 in accordance with one embodiment for facilitating automatic media editing performed by the media processing system 102 of FIG. 1A. It is understood that the flowchart 400 of FIG. 4 provides merely an example of the many different types of functional arrangements that may be employed to implement the operation of the various components of the media processing system 102. As an alternative, the flowchart of FIG. 4 may be viewed as depicting an example of steps of a method implemented in the media processing system 102 according to one or more embodiments.

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. It is understood that all such variations are within the scope of the present disclosure.

Beginning with block 410, media content is obtained and in block 420, semantic analysis is performed on text in at least a portion of the media content to obtain at least one semantic textual segment each corresponding to a text section of the media content. For some embodiments, the text section comprises at least one word in the text in the at least a portion of the media content. In block 430, at least one context token corresponding to the at least one semantic textual segment is generated. In block 440, the text section is visually accentuated according to the context token. For some embodiments, visually accentuating the text section comprises modifying the text section in the at least a portion of the media content and generating captions in the at least a portion of the media content. Note that modifying the visual appearance of text may be performed according to the literal meaning of the text section. For example, if the text section includes the word "fire" or "flame," the visual appearance of the text section may be modified with a fiery font. As another example, if the text section includes the word "big" or "huge," the visual appearance of the text section may be enlarged.

Figure 5:
FIGS. 5-8 illustrate various examples of subtitle modification performed by the visualizer in the media processing system of FIG. 1A in accordance with various embodiments of the present disclosure.
Figure 5:
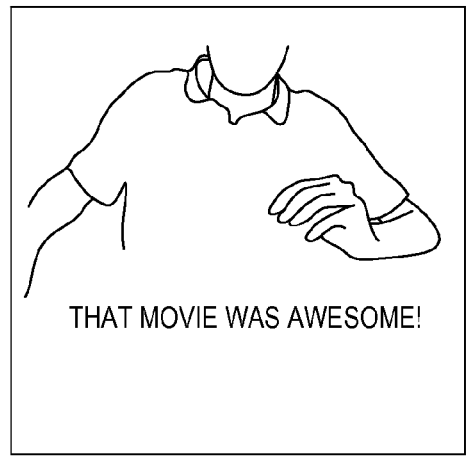
Figure 5:
Figure 5:
Figure 5:
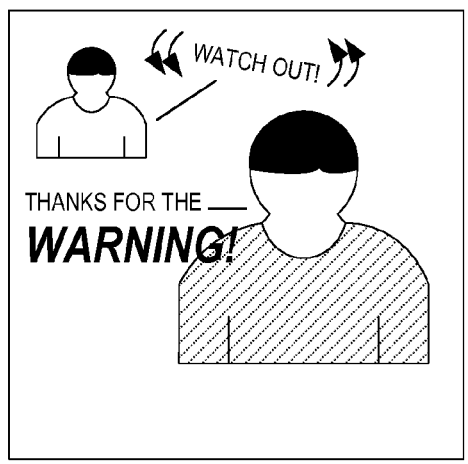
Figure 5:
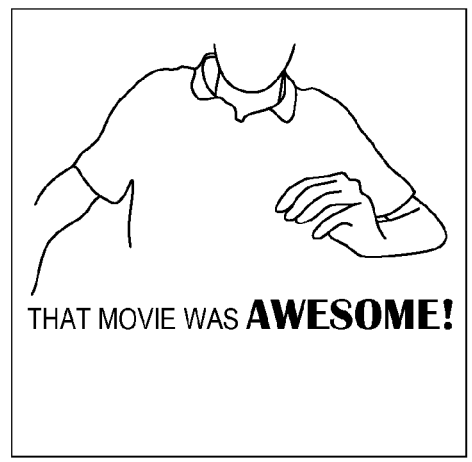
Figure 6:
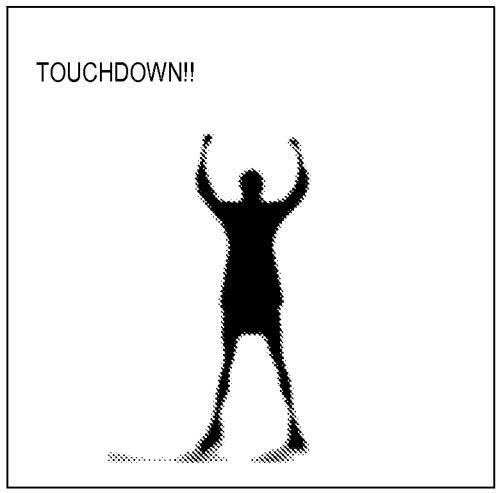
Figure 6:
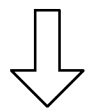
Figure 6:
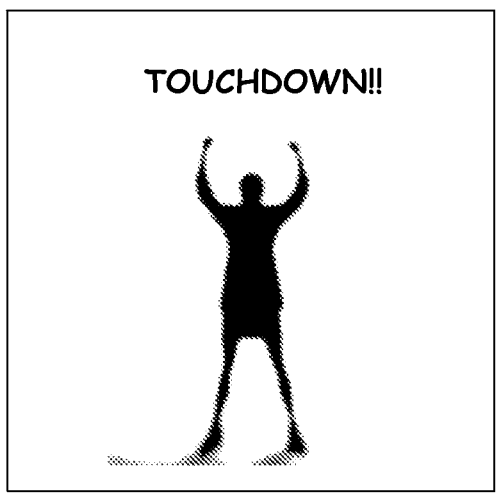
Figure 7:
Figure 7:
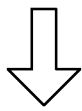
Figure 7:

To further illustrate the media editing techniques disclosed, reference is made to FIGS. 5-7, which provide various examples of modifications performed by the visualizer 121 (FIG. 1A) in the media processing system 102 (FIG. 1A) in accordance with various embodiments. FIG. 5 is an example where the visualizer 121 (FIG. 1A) changes the font size/style as well as the location of the subtitles. In the example to the left in FIG. 5, the content analyzer 114 (FIG. 1A) analyzes such contextual cues as speech volume (e.g., one or more individuals shouting), keywords/phrases (e.g., "watch out", "warning"), the presence of exclamation points in the subtitles, and so on. In this regard, the media processing system 102 is "text-aware" and is capable of visually accentuating a text section within text content.

In the example to the right in FIG. 5, the visualizer 121 selectively modifies the text sections containing the text "AWESOME" and the exclamation point in the subtitles. That is, rather than visually accentuating the entire line of subtitles, the visualizer 121 may be configured to visually accentuate only a portion of the subtitles (e.g., selective words/phrases/punctuation marks). In the example shown, only the word "AWESOME" and the exclamation point are visually accentuated by increasing the font size. In this regard, visually accentuating the text section according to the context token may comprise modifying the text section in the at least a portion of the media content and/or generating captions in the at least a portion of the media content.

As shown, the visualizer 121 also incorporates animation to further emphasize the words being spoken by the individual. Other forms of animation may include, for example and without limitation, a shrinking/stretching effect, a fade-in/fade-out effect, a shadowing effect, a flipping effect, and so on. The example in FIG. 5 also depicts graphics (i.e., lines) inserted into the media content by the visualizer 121 to indicate which individual is speaking.

FIG. 6 is an example where the visualizer 121 (FIG. 1A) changes the font size/style of the captions based on the body language of the individual as well as the presence of exclamation marks in the subtitles. FIG. 7 is an example where the visualizer 121 (FIG. 1A) changes the font size/style of the captions based on image attributes (e.g., low lighting; night time), keyword (e.g., "Halloween"), the presence of an exclamation mark in the subtitles, and so on.

Figure 8:

FIG. 8 is an example where the media content comprises digital photos with comments, descriptions, and other forms of annotation are embedded with the digital photos. For example, with reference back to the media content website 134 shown in FIG. 1, the media processing system 102 may retrieve media content from online photo sharing albums where one or more users upload photos and viewers add corresponding descriptions, comments, etc. to the uploaded photos. In the example shown in FIG. 8, the media content comprises digital photos with corresponding descriptions. As shown, the text section comprising the word "beautiful" is visually accentuated to place emphasis on this word. Note that only the appearance of "beautiful" is modified.

Figure 9:
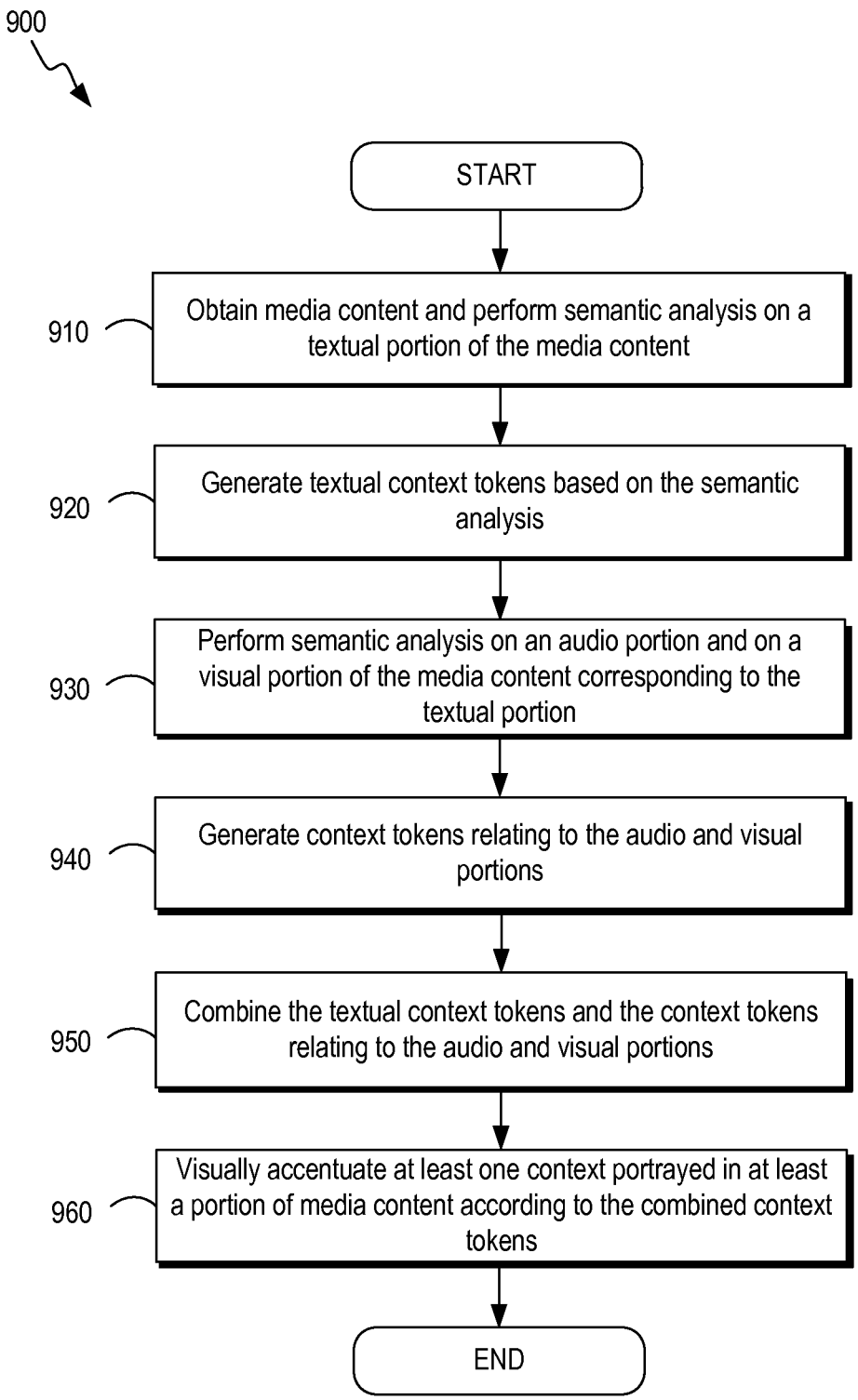
FIG. 9 is a top-level flowchart illustrating examples of functionality implemented as portions of the media processing system of FIG. 1A for facilitating automatic media editing according to an alternative embodiment of the present disclosure.

Reference is made to FIG. 9, which is a flowchart 900 in accordance with an alternative embodiment for facilitating automatic media editing performed by the media processing system 102 of FIG. 1A. It is understood that the flowchart 900 of FIG. 9 provides merely an example of the many different types of functional arrangements that may be employed to implement the operation of the various components of the media processing system 102. As an alternative, the flowchart of FIG. 9 may be viewed as depicting an example of steps of a method implemented in the media processing system 102 according to one or more embodiments.

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. It is understood that all such variations are within the scope of the present disclosure.

Beginning with block 910, media content is obtained and semantic analysis is performed on a textual portion of the media content. For example, as shown in FIG. 1B, the media content obtained by the media interface 112 (FIG. 1B) may include subtitles 151 (FIG. 1B) or captions.

In block 920, textual context tokens are generated based on the semantic analysis, and in block 930, semantic analysis is performed on an audio portion and on a visual portion of the media content corresponding to the textual portion. For example, the image analyzer 162 (FIG. 1B) and the audio analyzer 164 (FIG. 1B) in the content analyzer 114 (FIG. 1B) may be configured to analyze portions of the media content where dialog between individuals take place.

In block 940, context tokens relating to the audio and visual portions are generated. In block 950, the textual context tokens are combined with the context tokens relating to the audio and visual portions, and in block 960, at least one context portrayed in the at least a portion of media content is visually accentuated according to the combined context tokens.

Figure 10:
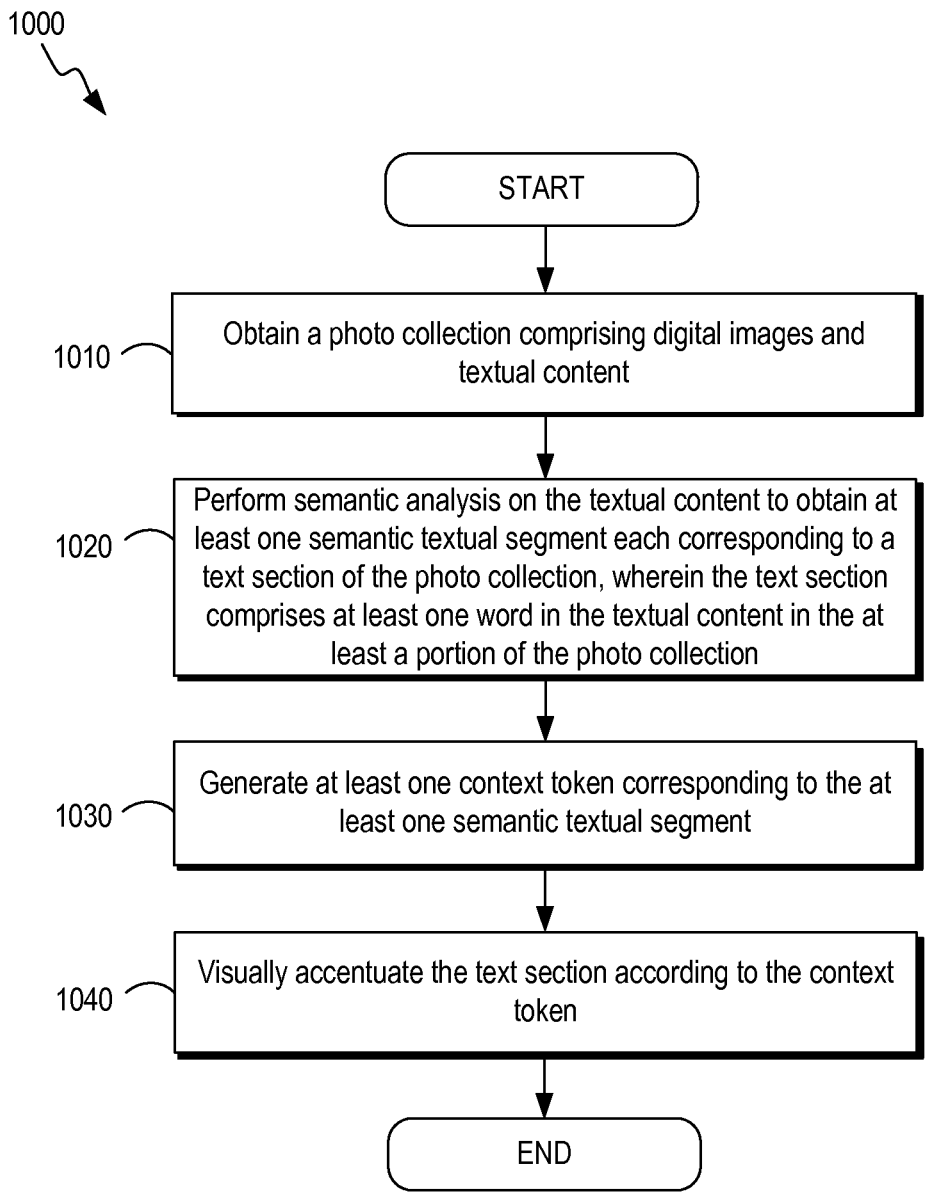
FIG. 10 is a top-level flowchart illustrating examples of functionality implemented as portions of the media processing system of FIG. 1A for facilitating automatic media editing according to an alternative embodiment of the present disclosure.

Reference is made to FIG. 10, which is a flowchart 1000 in accordance with an alternative embodiment for facilitating automatic media editing performed by the media processing system 102 of FIG. 1A. It is understood that the flowchart 1000 of FIG. 10 provides merely an example of the many different types of functional arrangements that may be employed to implement the operation of the various components of the media processing system 102. As an alternative, the flowchart of FIG. 10 may be viewed as depicting an example of steps of a method implemented in the media processing system 102 according to one or more embodiments.

Although the flowchart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. It is understood that all such variations are within the scope of the present disclosure.

Beginning with block 1010, a photo collection comprising digital images and textual content is obtained, and in block 1020, semantic analysis is performed on the textual content to obtain at least one semantic textual segment each corresponding to a text section of the photo collection. For some embodiments, the text section comprises at least one word in the textual content in the at least a portion of the photo collection. In block 1030, at least one context token corresponding to the at least one semantic textual segment is generated, and in block 1040, the text section is visually accentuated according to the context token.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a media processing device, comprising:
   obtaining, by the media processing device, media content;
   receiving, by the media processing device, pre-defined text comprising one of: subtitles and annotations associated with the media content;
   performing, by the media processing device, semantic analysis on the pre-defined text and a visual portion of the media content to obtain at least one semantic textual segment each corresponding to a text section of the pre-defined text, wherein the text section comprises at least one word in the pre-defined text in the at least a portion of the media content;
   generating, by the media processing device, at least one context token corresponding to the at least one semantic textual segment, wherein each context token comprises an entropy value representing a measure of contextual information conveyed by a corresponding semantic textual segment; and
   visually accentuating, by the media processing device, the text section according to the entropy value of each context token, wherein visually accentuating comprises selectively modifying a visual attribute of only the text section of the pre-defined text.

2. The method of claim 1, wherein performing semantic analysis on text in the at least a portion of the media content comprises:
   performing lexical analysis and tokenizing the text; and
   identifying predetermined key words in the tokenized text.

3. The method of claim 2, wherein the predetermined key words comprise at least one of:
- transition words;
- conjunctions;
- words that convey emphasis;
- repeated words;
- symbols; and
- predefined keywords from a database.

4. The method of claim 1, wherein the media content comprises visual content and wherein the text comprises subtitles.

5. The method of claim 4, wherein visually accentuating the text section according to the at least one context token comprises visually accentuating the text section within a line of subtitles according to a media stamp specifying a time for displaying the line of subtitles, and wherein the text section comprises a portion of the line.

6. The method of claim 1, wherein the media content comprises digital photos, and wherein the text comprises annotation of the digital photos.

7. The method of claim 6, wherein the text section comprises a portion of the annotation.

8. The method of claim 1, wherein visually accentuating, by the media processing device, the text section according to the at least one context token comprises at least one of:
- modifying the text section in the at least a portion of the media content; and
- generating captions in the at least a portion of the media content.

9. The method of claim 8, wherein generating captions comprises at least one of:
- generating text with animated graphics; and
- generating text with a varying position.

10. The method of claim 8, wherein modifying the text section comprises:
- mapping the at least one context token to the text section; and
- modifying a visual appearance of the text section according to the mapping.

11. The method of claim 10, wherein modifying the visual appearance comprises at least one of:
- modifying a font type of the text section;
- modifying a font size of the text section;
- modifying a font color of the text section;
- modifying a font effect of the text section; and
- modifying a location of the text section.

12. The method of claim 10, wherein modifying the visual appearance of text further comprises modifying the visual appearance of the text section according to the literal meaning of the text section.

13. The method of claim 1, wherein the text section comprises a plurality of words in the text in the at least a portion of the media content, and wherein visually accentuating the text section according to the at least one context token comprises visually accentuating each of the words in the text section differently.

14. The method of claim 1, further comprising:
- performing semantic analysis on at least one of: audio content and visual content in at least a portion of the media content to obtain at least one of: a semantic audio segment and a semantic visual segment, each corresponding to at least one of: an audio section and a visual section of the media content;
- generating at least one context token corresponding to the at least one of: the semantic audio segment and the semantic visual segment;
- combining the at least one context token; and
- visually accentuating the text section according to the combined context tokens.

15. The method of claim 14, wherein performing semantic analysis on visual content in the at least a portion of the media content comprises analyzing at least one of:
- human facial expressions;
- body language;
- themes;
- color hue;
- color temperature of the at least a portion of the media content; and
- predefined image patterns/styles from a database.

16. The method of claim 14, wherein performing semantic analysis on audio content in the at least a portion of the media content comprises analyzing at least one of:
- speech tone;
- speech speed;
- fluency;
- punctuation;
- location in which audio content originates;
- direction in which audio content is conveyed;
- speech volume; and
- predefined audio patterns/styles from a database.

17. The method of claim 14, wherein each context token comprises a media stamp and a semantic vector.

18. The method of claim 17, wherein each semantic vector comprises at least one semantic dimension and a corresponding strength value of the semantic dimension.

19. The method of claim 1, wherein performing semantic analysis comprises analyzing emotional expressions and contexts of the at least a portion of the media content.

20. The method of claim 19, wherein performing semantic analysis is performed on at least one of text, visual content, and audio content in the at least a portion of the media content.

21. A system for editing media content, comprising:
- a processor; and
- at least one application executable in the processor, the at least one application comprising:
  - a media interface for obtaining media content and for receiving pre-defined text comprising one of: subtitles and annotations associated with the media content;
  - a content analyzer for performing semantic analysis on the pre-defined text and a visual portion of the media content to obtain at least one semantic textual segment each corresponding to a text section of the predefined text, wherein the text section comprises at least one word in the pre-defined text in the at least a portion of the media content;
  - a tokenizer for generating at least one context token corresponding to the at least one semantic textual segment, wherein each context token comprises an entropy value representing a measure of contextual information conveyed by a corresponding semantic textual segment; and
  - a visualizer for visually accentuating the text section according to the entropy value of each context token, wherein visually accentuating comprises selectively modifying a visual attribute of only the text section of the pre-defined text.

22. The system of claim 21, wherein each context token comprises a media stamp and a semantic vector.

23. The system of claim 22, wherein each semantic vector comprises at least one semantic dimension and a corresponding strength value of the semantic dimension, and wherein each media stamp comprises a time stamp in the media content corresponding to the semantic vector.

24. The system of claim 21, wherein the content analyzer performs semantic analysis by analyzing emotional expressions and contexts of the at least a portion of the media content.

25. The system of claim 24, wherein performing semantic analysis is performed on at least one of text, images, and audio in the at least a portion of the media content.

26. The system of claim 21, wherein the visualizer visually accentuates the text section by performing at least one of:
   modifying text in the at least a portion of the media content; and
   generating captions in the at least a portion of the media content.

27. A non-transitory computer-readable medium embodying a program executable in a computing device, comprising:
   code that obtains media content;
   code that receives pre-defined text comprising one of: subtitles and annotations associated with the media content;
   code that performs semantic analysis on the text and a visual portion of the media content to obtain at least one semantic textual segment each corresponding to a text section of the media content, wherein the text section comprises at least one word in the text in the at least a portion of the media content;
   code that generates at least one context token corresponding to the at least one semantic textual segment, wherein each context token comprises an entropy value representing a measure of contextual information conveyed by a corresponding semantic textual segment; and
   code that visually accentuates the text section according to the entropy value of each context token.

28. The non-transitory computer-readable medium of claim 27, wherein the code that visually accentuates at least one context further comprises:
   code that modifies text in the at least a portion of the media content; and
   code that generates captions in the at least a portion of the media content.

29. A method implemented in a media processing, comprising:
   obtaining, by the media processing device, media content;
   receiving pre-defined text comprising one of: subtitles and annotations associated with the media content;
   performing semantic analysis on a textual portion and at least one of: a visual portion and an audio portion of the media content;
   generating, by the media processing device, textual context tokens based on the semantic analysis, wherein each textual context token comprises an entropy value representing a measure of contextual information conveyed by a corresponding textual portion;
   performing semantic analysis on an audio portion and on a visual portion of the media content corresponding to the textual portion;
   generating context tokens relating to the audio and visual portions;
   combining, by the media processing device, the textual context tokens and the context tokens relating to the audio and visual portions; and
   visually accentuating, by the media processing device, at least one context portrayed in at least a portion of media content according to the combined context tokens.

30. A method implemented in a media processing device, comprising:
   obtaining, by the media processing device, a photo collection comprising digital images and textual content;
   receiving pre-defined text comprising annotations associated with the photo collection;
   performing, by the media processing device, semantic analysis on the textual content and visual content of the photo collection to obtain at least one semantic textual segment each corresponding to a text section of the photo collection, wherein the text section comprises at least one word in the textual content in the at least a portion of the photo collection;
   generating, by the media processing device, at least one context token corresponding to the at least one semantic textual segment, wherein each context token comprises an entropy value representing a measure of contextual information conveyed by a corresponding semantic textual segment; and
   visually accentuating, by the media processing device, the text section according to the entropy value of each context token.

31. The method of claim 30, wherein the textual content comprises annotation of the digital photos.

32. The method of claim 31, wherein the text section comprises a portion of the annotation.

* * * * *